US010867381B2

(12) United States Patent
An (10) Patent No.: US 10,867,381 B2
(45) Date of Patent: Dec. 15, 2020

(54) DEFECT DETECTION APPARATUS AND METHOD

(71) Applicant: Samsung Display Co., Ltd., Yongin-si (KR)

(72) Inventor: Byoung Kwan An, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 110 days.

(21) Appl. No.: 16/203,615

(22) Filed: Nov. 29, 2018

(65) Prior Publication Data

US 2019/0340739 A1 Nov. 7, 2019

(30) Foreign Application Priority Data

May 2, 2018 (KR) .................. 10-2018-0050421

(51) Int. Cl.
*G06T 7/00* (2017.01)
*G06T 7/11* (2017.01)
*G06T 11/00* (2006.01)
*G09G 3/00* (2006.01)
*G06T 11/20* (2006.01)

(52) U.S. Cl.
CPC ............... *G06T 7/001* (2013.01); *G06T 7/11* (2017.01); *G06T 11/001* (2013.01); *G06T 11/203* (2013.01); *G09G 3/006* (2013.01); *G09G 2330/10* (2013.01)

(58) Field of Classification Search
CPC ... G06T 11/001; G06T 11/203; G06T 7/0004; G06T 7/001; G06T 7/11; G06T 2207/20021; G06T 2207/30108; G06T 5/20; G09G 3/006; G09G 2330/10
See application file for complete search history.

(56) References Cited

U.S. PATENT DOCUMENTS

| | | | | |
|---|---|---|---|---|
| 6,459,293 B1* | 10/2002 | Keshavarzi | .......... | G01R 31/275 324/750.03 |
| 2006/0067569 A1* | 3/2006 | Haga | ...................... | G06T 5/009 382/141 |
| 2006/0104506 A1* | 5/2006 | Kim | ......................... | G06T 5/40 382/162 |
| 2007/0030215 A1* | 2/2007 | Lee | ......................... | G09G 3/22 345/74.1 |
| 2007/0031025 A1* | 2/2007 | Lim | ...................... | G06T 7/001 382/149 |
| 2012/0031577 A1* | 2/2012 | Banks | .................... | D21H 21/30 162/198 |
| 2015/0130867 A1* | 5/2015 | Park | ..................... | G09G 3/2092 345/694 |
| 2017/0004612 A1* | 1/2017 | Hsu | ...................... | G06K 9/4647 |

FOREIGN PATENT DOCUMENTS

CN  105761271 A  *  7/2016
KR  10-0648350     11/2006

* cited by examiner

*Primary Examiner* — Jingge Wu
(74) *Attorney, Agent, or Firm* — H.C. Park & Associates, PLC

(57) ABSTRACT

A defect detection apparatus including a region setter which sets a region of interest in an image including a plurality of pixels, and a defect detector which divides the region of interest into a plurality of segments and generates a trend line for each of the segments based on gray level values of the pixels. Here, the defect detector detects a stain in the image by comparing the gray level values of the pixels with the trend line.

16 Claims, 12 Drawing Sheets

DEFECT DETECTION APPARATUS AND METHOD

CROSS REFERENCE TO RELATED APPLICATION

This application claims priority from and the benefit of Korean Patent Application No. 10-2018-0050421, filed on May 2, 2018, which is hereby incorporated by reference for all purposes as if fully set forth herein.

BACKGROUND

Field

Exemplary embodiments of the invention relate generally to a defect detection apparatus and method.

Discussion of the Background

With the development of multimedia, display devices are becoming increasingly important. Accordingly, various types of display devices, such as liquid crystal displays (LCDs) and organic light emitting displays (OLEDs), are being used.

Defects, such as stains may be generated on the surface of a display device for various reasons. The stain defects cause a specific area to be displayed with uneven luminance when the entire screen is displayed at a constant gray level. Therefore, operators perform various visual inspections of the display device in order to detect defects, such as stains. However, since such a naked eye-based method depends on the judgment of an individual operator, it is very subjective, and a problem is highly likely to occur due to a mistake. On the other hand, a defect inspection method based on a threshold has low detection accuracy depending on the shape of a specific stain defect.

The above information disclosed in this Background section is only for understanding of the background of the inventive concepts, and, therefore, it may contain information that does not constitute prior art.

SUMMARY

Exemplary embodiments of the invention provide a defect detection apparatus and method for increasing stain defect detection accuracy.

Exemplary embodiments of the invention also provide a defect detection apparatus and method which can prevent the execution of unnecessary subsequent processes by applying defect inspection between module processes.

Additional features of the inventive concepts will be set forth in the description which follows, and in part will be apparent from the description, or may be learned by practice of the inventive concepts.

An exemplary embodiment of the invention provides a defect detection apparatus including a region setter which sets a region of interest in an image including a plurality of pixels, and a defect detector which divides the region of interest into a plurality of segments and generates a trend line for each of the segments based on gray level values of the pixels. The defect detector detects a stain in the image by comparing the gray level values of the pixels with the trend line.

The defect detector may calculate the gray level values of the pixels disposed in each of the segments along at least one of a vertical line and a horizontal line.

The defect detector may generate the trend line by applying a least squares method to the gray level values of the pixels.

The defect detector may detect the stain in the image by comparing a distance value between a gray level value variation line formed by connecting the gray level values of the pixels and the trend line with a preset value.

The region setter may convert the image into a black-and-white image and provides the black-and-white image to the defect detector.

Another exemplary embodiment of the invention provides a defect detection apparatus including a target object, a photographing unit which generates an image having a plurality of pixels by photographing the target object, and a defect determination unit which receives the image and determines whether the target object is defective by detecting a stain in the image. The defect determination unit divides the image into a plurality of segments, generates a trend line for each of the segments based on gray level values of the pixels, and detects the stain in the image by comparing the gray level values of the pixels with the trend line.

The target object may include a protective film.

The defect determination unit may calculate the gray level values of the pixels disposed in each of the segments along at least one of a vertical line and a horizontal line.

The defect determination unit may generate the trend line by applying a least squares method to the gray level values of the pixels.

Another exemplary embodiment of the invention provides a defect detection method including setting a region of interest in an image including a plurality of pixels, dividing the region of interest into a plurality of segments, calculating gray level values of the pixels in each of the segments, generating a trend line based on the calculated gray level values, and detecting a stain in the image by comparing the gray level values with the trend line.

The calculating of the gray level values may calculate the gray level values of the pixels disposed in each of the segments along at least one of a vertical line and a horizontal line.

The generating of the trend line may generate the trend line by applying a least squares method to the gray level values of the pixels.

The detecting of the stain in the image may detect the stain in the image by comparing a distance value between a gray level value variation line formed by connecting the gray level values of the pixels and the trend line with a preset value.

The method may further include converting the image into a black-and-white image.

The method may further include generating the image by photographing a target object before the setting of the region of interest.

The target object may include a protective film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments of the present disclosure will be described with reference to the accompanying drawings.

Figure 1:
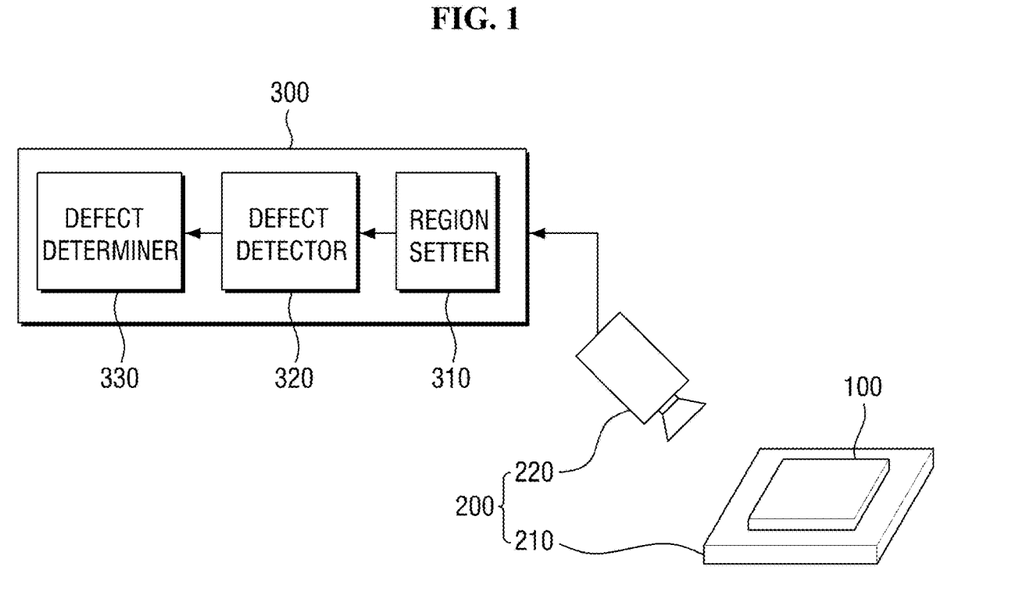
FIG. 1 is a schematic diagram of a defect detection apparatus according to an exemplary embodiment.

FIG. 1 is a schematic diagram of a defect detection apparatus according to an exemplary embodiment.

Referring to FIG. 1, the defect detection apparatus may include a photographing unit 200 which generates an image by photographing a target object 100 and a defect determination unit 300 which determines whether the target object 100 is defective based on the image. In an exemplary embodiment, a defect of the target object 100 is defined as a defect such as a stain on the target object 100.

The target object 100 may be an element of a display device that displays an image. Here, the element of the display device is in a state before being formed into the display device and may include a protective film for protecting the element from external impacts and foreign substances. In an exemplary embodiment, the target object 100 may be the display device itself. A case where the target object 100 is an element of the display device will hereinafter be described as an example. In addition, the target object 100 will be described in more detail later with reference to FIG. 3.

The photographing unit 200 may generate an image by photographing the target object 100 to be inspected. The photographing unit 200 may provide the generated image to the defect determination unit 300. The photographing unit 200 may include a stage 210 and a camera 220.

The target object 100 may be placed on the stage 210. The camera 220 may generate an image by photographing the target object 100 placed on the stage 210. The position and tilt angle of the camera 220 are not particularly limited as long as the camera 220 can generate an image used for defect detection. In an exemplary embodiment, the camera 220 may be disposed at a predetermined distance above the stage 210, and may be tilted toward the target object 100 at an angle of about 30 to 60 degrees. The type of the camera 220 is not particularly limited. In an exemplary embodiment, the camera 220 may be a charge-coupled device (CCD) camera. Although not illustrated in the drawing, the photographing unit 200 may further include a lighting unit which illuminates the target object 100.

The defect determination unit 300 may determine whether the target object 100 has a defect, such as a stain, by using an image received from the camera 220. In an exemplary embodiment, the defect determination unit 300 may be an electronic device, such as a computer having an algorithm for determining a stain defect. The defect determination unit 300 may generate trend lines by detecting gray level values of the image and then detect a stain of the target object 100 by comparing the gray level values with the trend lines. The defect determination unit 300 may determine whether the target object 100 is defective by comparing, for example, the size of the detected stain with a preset reference size.

To this end, the defect determination unit 300 may include a region setter 310, a defect detector 320, and a defect determiner 330.

The region setter 310 may obtain an image from the camera 220 and set a region of interest in the image. The region of interest is defined as a region to be inspected for a stain defect. The size and position of the region of interest are not particularly limited and may vary according to the size and type of the target object 100. In addition, the region setter 310 may convert the image into a black-and-white image.

The image of the target object 100 photographed by the camera 220 may include a plurality of pixels. Here, each of the pixels is a minimum unit or a dot constituting the image. The number of pixels may vary according to the performance of the camera 220.

The defect detection unit 320 may receive the image, in which the region of interest has been set, from the region setter 310 and may detect a stain in the image. More specifically, the defect detector 320 may calculate a gray level value of each of the pixels included in the received black-and-white image. Here, the gray level value is defined as a gray value representing a shade of gray between black and white. Next, the defect detector 320 may generate a plurality of trend lines based on the calculated gray level values and extract and mark the contours of a stain by comparing the trend lines with the calculated gray level values. The image in which the contours of the stain have been marked may have greater contrast between a stained portion and an unstained portion.

The defect determiner 330 may receive the image having the extracted contours from the defect detector 320 and determine whether the target object 100 is defective based on the received image. In an exemplary embodiment, the defect determiner 330 may convert the contours of the stain into a numerical value and determine whether the target object 100 is defective by comparing the numerical value with a preset reference value.

A defect detection method according to an exemplary embodiment will now be described.

Figure 2:
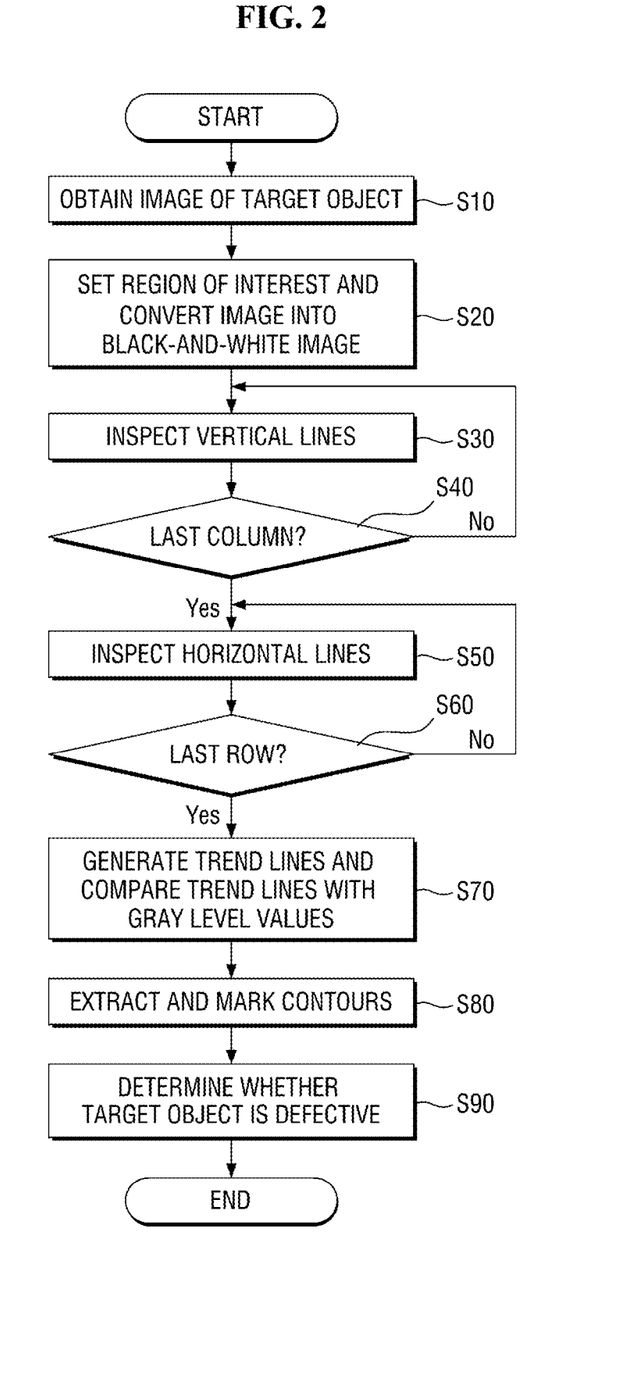
FIG. 2 is a flowchart illustrating a defect detection method according to an exemplary embodiment.
Figure 3:
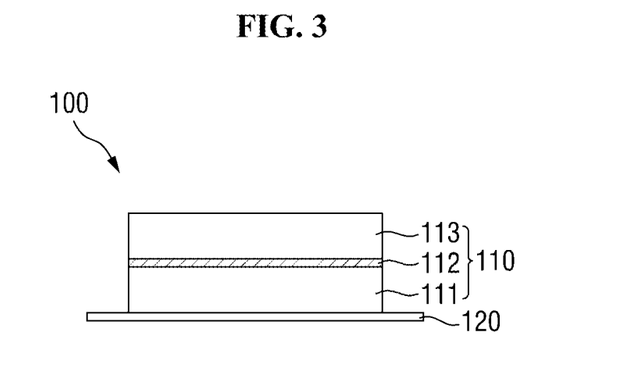
FIG. 3 is a cross-sectional view of a target object illustrated in FIG. 1.
Figure 4:
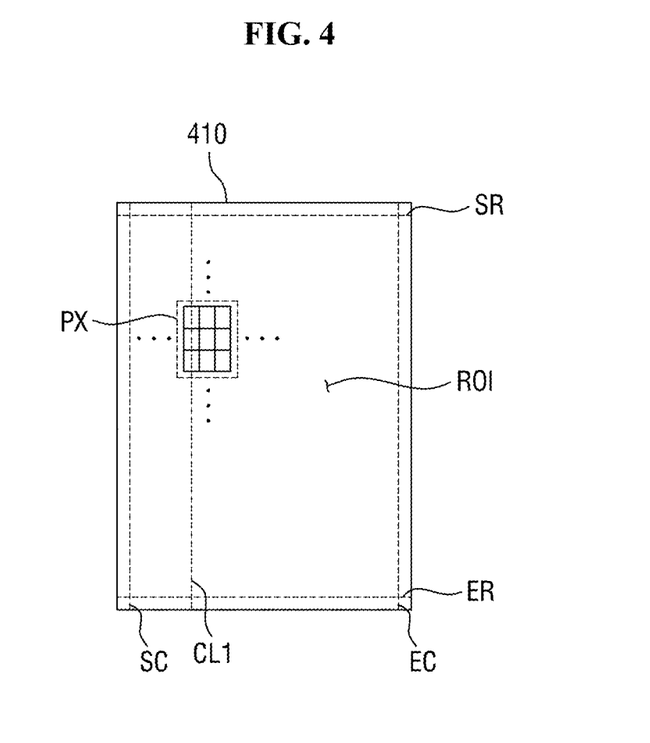
FIG. 4 shows a photographed image of the target object illustrated in FIG. 3.
Figure 5:
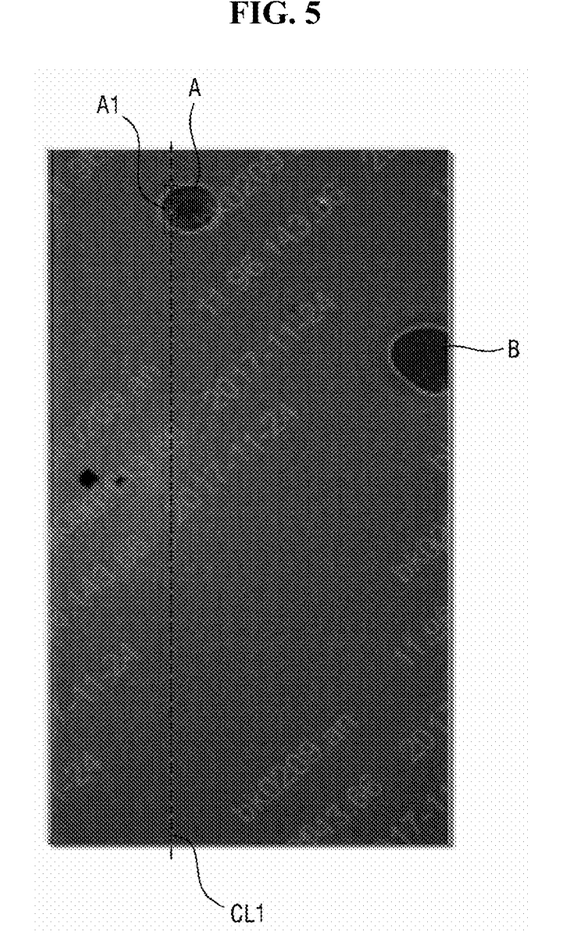
FIG. 5 shows an actual image corresponding to the image of FIG. 4.
Figure 6:
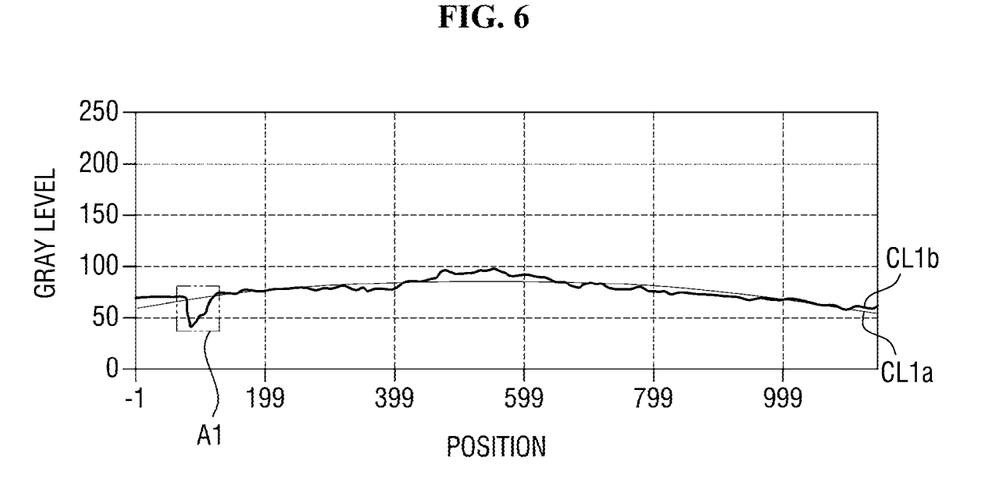
FIG. 6 is a graph illustrating gray level values corresponding to an inspection column shown in FIG. 5 and a trend line generated based on the gray level values.
Figure 7:
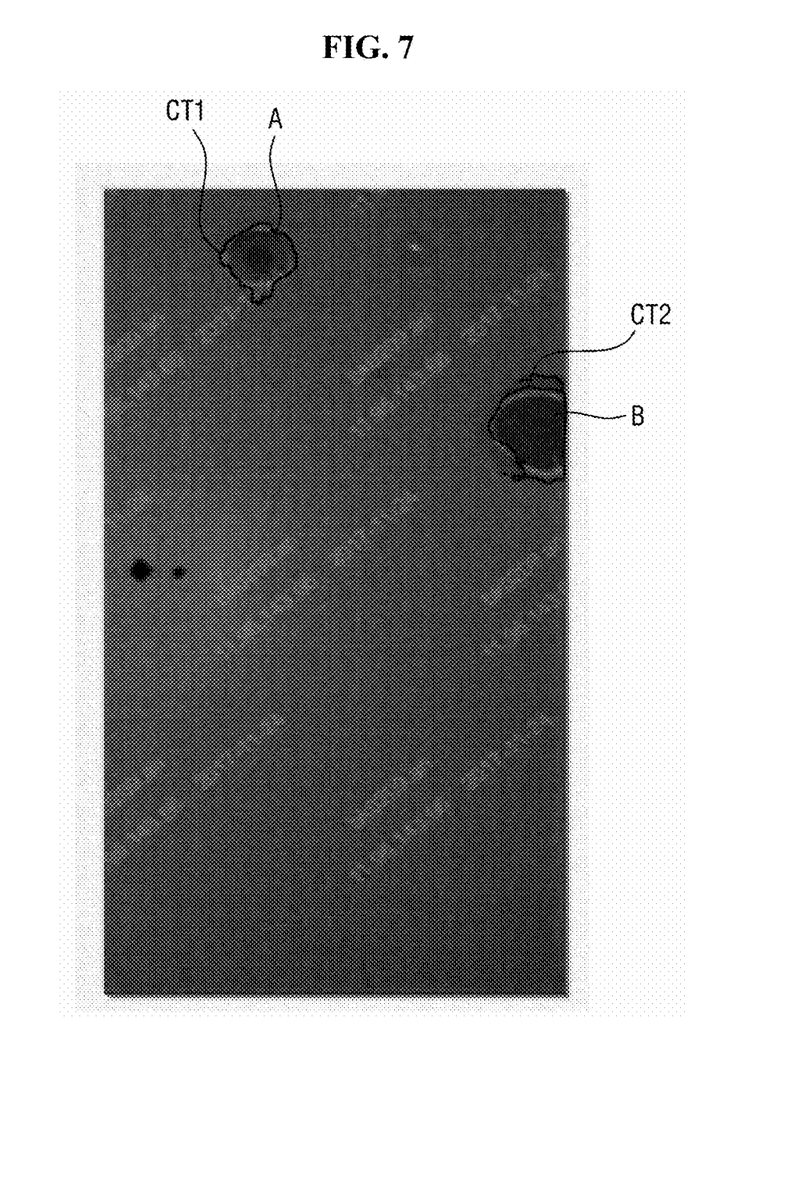
FIG. 7 shows the contours of stains marked in the image of FIG. 5.

FIG. 2 is a flowchart illustrating a defect detection method according to an exemplary embodiment. FIG. 3 is a cross-sectional view of an embodiment of the target object 100 illustrated in FIG. 1. FIG. 4 shows a photographed image of the target object 100 illustrated in FIG. 3. FIG. 5 shows an actual image corresponding to the image of FIG. 4. FIG. 6 is a graph illustrating gray level values corresponding to an inspection column shown in FIG. 5 and a trend line generated based on the gray level values. FIG. 7 shows the contours of stains marked in the image of FIG. 5.

First, an operation of obtaining an image of the target object 100 will be described with reference to FIGS. 1 through 3.

The camera 220 may obtain an image by photographing the target object 100 placed on the stage 210 (operation S10). As described above, the target object 100 may be an element of a display device, the element hereinafter being referred to as a display module 110.

More specifically, the target object 100 may include the display module 110 and a protective film 120.

The display module 110 is an element of a display device. When determined to be non-defective, the display module 110 may be coupled to other elements of the display device to form the display device. In an exemplary embodiment, the display module 110 may include an input sensing panel 111, an adhesive layer 112, and a window panel 113. In an exemplary embodiment, an element bonded to another element by an adhesive member will be expressed as a "panel." In addition, an element formed with another element through a continuous process will be expressed as a "layer." The panel includes a base layer that provides a base surface. On the other hand, the layer may not have the base layer. That is, when an element is expressed as a "layer," it denotes that the element is disposed directly on an upper surface of another element and uses the upper surface of the another element as its base layer. Here, the base layer may be a single film, such as a synthetic resin film or a composite material film or may be a stack of a plurality of films. In addition, the base layer may include, for example, a glass substrate.

The input sensing panel 111 may, in an exemplary embodiment, sense a user's hand or touch pen that touches the display module 110. In an exemplary embodiment, the input sensing panel 111 may sense pressure applied from the outside.

The window panel 113 may protect the input sensing panel 111 from external scratches or the like. The window panel 113 may be disposed on the input sensing panel 111 and may be bonded to the input sensing panel 111 by the adhesive layer 112.

The adhesive layer 112 may be disposed between the input sensing panel 111 and the window panel 113 to bond the input sensing panel 111 and the window panel 113 together. The adhesive layer 112 may be a pressure sensitive adhesive (PSA) member, an optically clear adhesive (OCA) member, or an optically clear resin (OCR) film.

The protective film 120 may be disposed under the input sensing panel 111. The protective film 120 may protect the display module 110 from foreign substances or external impacts until the display module 110 is coupled to another module. That is, the protective film 120 may be removed before the display module 110 is coupled to another module. In an exemplary embodiment, the protective film 120 may not be removed, but may be used as a base layer or a coupling member for coupling with another module.

As described above, the display module 110 may be formed by stacking the input sensing panel 111, the adhesive layer 112, and the window panel 113. Due to defects in an element itself, such as the input sensing panel 111 or the window panel 113, foreign substances between the elements, an accident occurring in the process of bonding the elements, etc., defects such as stains may be generated in the display module 110.

In particular, in the case of the target object 100 in which the protective film 120 is attached to the display module 110 as illustrated in FIG. 3, defects of the display module 110 may not be easily detected due to the protective film 120, for example, due to the non-uniform reflectance or refractive index of the surface of the protective film 120.

A method of detecting a stain defect of the target object 100 including the display module 110 to which the protective film 120 is attached will now be described in detail.

Referring to FIGS. 1, 2, and 4, the region setter 310 may set a region of interest ROI in an image 410 obtained from the camera 220 and convert the image 410 into a black-and-white image (operation S20).

As described above, the region of interest ROI is defined as a region to be inspected to find a stain defect in the image 410. Here, the image 410 may include a plurality of pixels PX. Each of the pixels PX is a minimum unit or a dot constituting the image 410. The number, arrangement, etc. of the pixels PX may vary according to the performance of the camera 220.

After the region setter 310 sets the region of interest ROI in the image 410 including the pixels PX, it may convert the image 410 into a black-and-white image and provide the back-and-white image to the defect detector 320.

While a case where the region setter 310 converts the image 410 into a black-and-white image after setting the region of interest ROI in the image 410 has been described herein, the inventive concepts are not limited thereto. That is, in an exemplary embodiment, the region setter 310 may set the region of interest ROI after calculating gray level values. The shape, size and position of the region of interest ROI are not limited to those illustrated in FIG. 4.

Next, the defect detector 320 may detect a stain defect in the black-and-white image.

More specifically, the defect detector 320 may calculate gray level values of the black-and-white image. That is, the defect detector 320 may calculate a gray level value for the position of each of the pixels PX included in the black-and-white image and express the calculated gray level values as a gray level variation line regarding shades of gray between black and white.

The defect detector 320 may calculate gray level values in each of a vertical direction and a horizontal direction of the black-and-white image. The order in which the defect detector 320 calculates gray level values is not particularly limited. That is, the defect detector 320 may calculate gray level values in the horizontal direction first or may calculate gray level values in the vertical direction first.

A case where gray level values are initially calculated in the vertical direction will be described below as an example.

The defect detector 320 may calculate gray level values of the pixels PX in the vertical direction from a vertical start line SC to a vertical end line EC (operation S30). More specifically, the defect detector 320 may calculate respective gray level values of pixels arranged in an inspection column CL1 from among the pixels PX. Then, the defect detector 320 may check whether calculated gray level values correspond to the vertical end line EC which is a last column (operation S40).

If the calculated gray level values correspond to the vertical end line EC, the defect detector 320 may calculate gray level values of the pixels PX in the horizontal direction from a horizontal start line SR to a horizontal end line ER (operation S50). The defect detector 320 may check whether the calculated gray level values correspond to the horizontal end line ER which is a last row (operation S60).

If the calculated gray level values correspond to the horizontal end line ER, the defect detector 320 may generate a plurality of trend lines based on the calculated gray level values and compare the trend lines with the gray level values corresponding to the trend lines (operation S70).

The defect detector 320 may generate a plurality of trend lines based on gray level values for each column and each row. Here, the trend lines may include a plurality of vertical trend lines respectively corresponding to the columns and a plurality of horizontal trend lines respectively corresponding to the rows. In an exemplary embodiment, the defect detector 320 may calculate gray level values for all rows or columns and then generate a plurality of trend lines at a time based on the calculated gray level values. In an exemplary embodiment, the defect detector 320 may calculate gray level values for one row or one column and then immediately generate a trend line corresponding to the row or column. The defect detector 320 may further include a memory for storing the gray level values and the generated trend lines.

Next, the defect detector 320 may compare the generated trend lines with the gray level values corresponding to the trend lines. A process of generating a trend line for the inspection column CL1 and comparing the trend line with gray level values will now be described as an example with reference to FIGS. 1 and 4 through 6.

Regions A and B shown in FIG. 5 correspond to stain defect regions. Here, a stain defect region refers to a region having a lower or higher gray level than the surrounding region and has an amorphous shape. In addition, the graph shown in FIG. 6 illustrates gray level values of pixels arranged in the inspection column CL1 according to pixel position.

First, a process of generating a trend line CL1a based on gray level values for the inspection column CL1 will be described.

The defect detector 320 may generate the trend line CL1a by considering the distribution of the gray level values for the inspection column CL1. If the gray level values for the inspection column CL1 shown in FIG. 6 are connected, a gray level value variation line CL1b is generated. The overall trend of the gray level value variation line CL1b may be expressed as a quadratic equation, like the trend line CL1a shown in FIG. 6. Alternatively, the trend line CL1a may be expressed as a cubic equation in consideration of the overall trend of the gray level value variation line CL1b.

More specifically, for example, the defect detector 320 may generate the trend line CL1a using a least squares method for the gray level values of the inspection column CL1. The least squares method may be used to determine most probable values of unknowns when the total number of measured values exceeds the number of unknowns. Based on the gray level value variation line CL1b obtained by connecting the gray level values for the inspection column CL1, the defect detector 320 may calculate estimated values by calculating the values of a, b and c of a quadratic equation represented by Equation 1 using the least squares method.

$$\text{Estimated value} = an^2 + bn + c \tag{1}$$

The defect detector 320 may calculate an estimated value corresponding to the gray level value of each of the pixels arranged in the inspection column CL1 based on the gray level value of each of the pixels arranged in the inspection column CL1. If the calculated estimated values are connected, the trend line CL1a shown in FIG. 6 is generated. In addition, if the gray level values corresponding to the inspection column CL1 are connected, the gray level value variation line CL1b shown in FIG. 6 is generated.

The defect detector 320 determines a specific pixel as a stained pixel when a distance value between the trend line CL1a and the gray level value variation line CL1b in the specific pixel is outside a preset range.

After completing the inspection in the horizontal and vertical directions, the defect detector 320 may extract and mark the contours of pixels determined as stained pixels (operation S80). In an exemplary embodiment, the defect detector 320 may apply a median filter to remove noise that may be generated in the process of extracting contours. Here, the noise refers to a case where a pixel, which is not a stain defect region, is determined as a stained pixel due to some errors occurring during the application of the least squares method.

Referring to FIG. 7, contours CT1 and CT2 of stained pixels disposed in the regions A and B of FIG. 5 are marked in the image.

The defect determiner 330 may convert regions marked as stain defects by the contours CT1 and CT2 into numerical values and compare the values with a preset reference value to determine whether the target object 100 is defective (operation S90). For example, if the areas of the regions marked as stain defects by the contours CT1 and CT2 are larger than a preset reference area or the average gray level values of the regions marked as stain defects by the contours CT1 and CT2 are higher than a preset reference gray level value, the target object 100 may be determined to be defective.

That is, the defect detection apparatus according to this exemplary embodiment may calculate gray level values of the photographed image 410 of the target object 100 and compare the gray level values with generated trend lines to determine whether the target object 100 is defective. Therefore, whether the target object 100 is defective can be determined more objectively, compared with subjective determination by an individual operator. In particular, in the case of the target object 100 having the protective film 120 attached to the display module 110, even if the surface of the protective film 120 has non-uniform reflectance or refractive index, it is possible to more accurately detect whether the target object 100 is defective. Furthermore, since whether the target object 100 is defective can be determined before the target object 100 is completed, i.e., in a modularized state, the execution of unnecessary subsequent processes can be minimized.

In an exemplary embodiment, the target object 100 has been described as the display module 110 including the input sensing panel 111, the adhesive layer 112, and the window panel 113. However, the target object 100 is not limited to this example. That is, the target object 100 can include at least some of a display panel for displaying an image, an input sensing panel for sensing input, an anti-reflection panel for reducing reflectance of external light, and a window panel.

Figure 8:
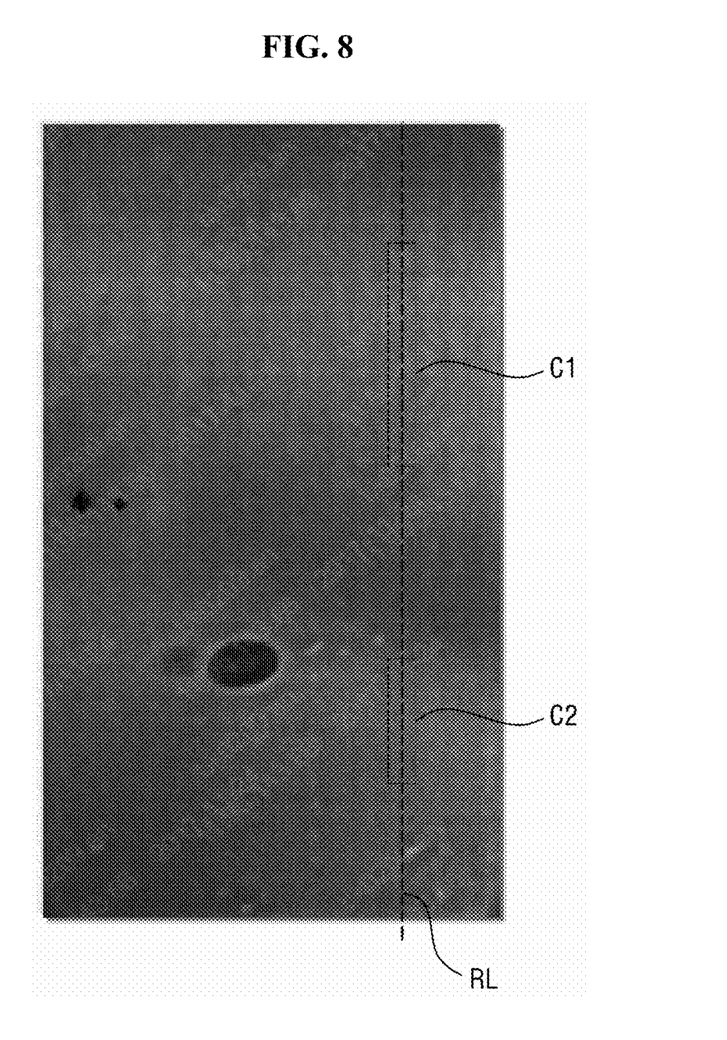
FIG. 8 shows an image having a gray level distribution in gradation form.
Figure 9:
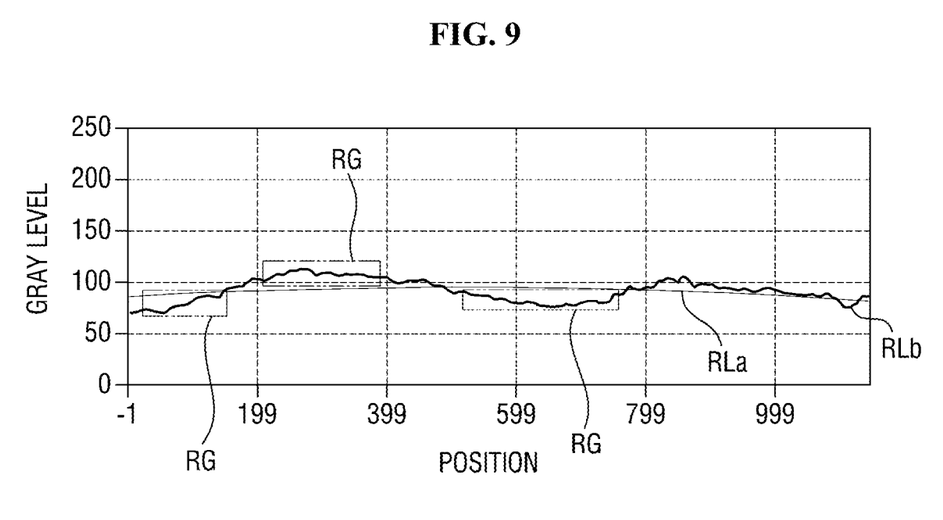
FIG. 9 is a graph illustrating a gray level distribution and a trend line for a reference line shown in FIG. 8

If the surface of the protective film 120 has a gray level distribution in gradation form, that is, shows a great change in gray level on the graph, it is difficult to express the overall trend of a gray level value variation line using a quadratic or cubic equation. If a trend line is generated as a quartic or higher equation, it may be inaccurate. FIGS. 8 and 9 will now be described by way of example.

FIG. 8 shows an image having a gray level distribution in gradation form. FIG. 9 is a graph illustrating a gray level distribution and a trend line for a reference line RL shown in FIG. 8.

In the image shown in FIG. 8, some regions C1 and C2 around the reference line RL have gray levels higher than those of other regions. That is, the image shown in FIG. 8 has a gray level distribution in gradation form, particularly around the reference line RL. Accordingly, gray level values corresponding to the reference line RL are represented by a gray level distribution variation line RLb having a predetermined period. In the case of the gray level distribution variation line RLb, it is difficult to express a trend line as a quadratic or cubic equation.

In addition, if a trend line RLa is expressed using a quartic or higher equation, it is inaccurately represented as illustrated in FIG. 9. Here, if the inaccurate trend line RLa is used to determine whether there is a stain defect, a region which is actually not a defect can be determined as a stain defect. For example, regions RG, which are relatively far away from the trend line RLa, may be determined as stain defects even though gray level values of the regions RG are just expressed relatively high or low due to the gradation of the protective film 120. In this case, a corresponding target object may be determined to be defective even if it is not actually defective.

In this regard, a defect detection method according to an exemplary embodiment may increase the accuracy of defect determination by dividing an image into a plurality of segments and comparing gray level values and a trend line in each segment. This will now be described in more detail with reference to FIGS. 10 through 12.

Figure 10:
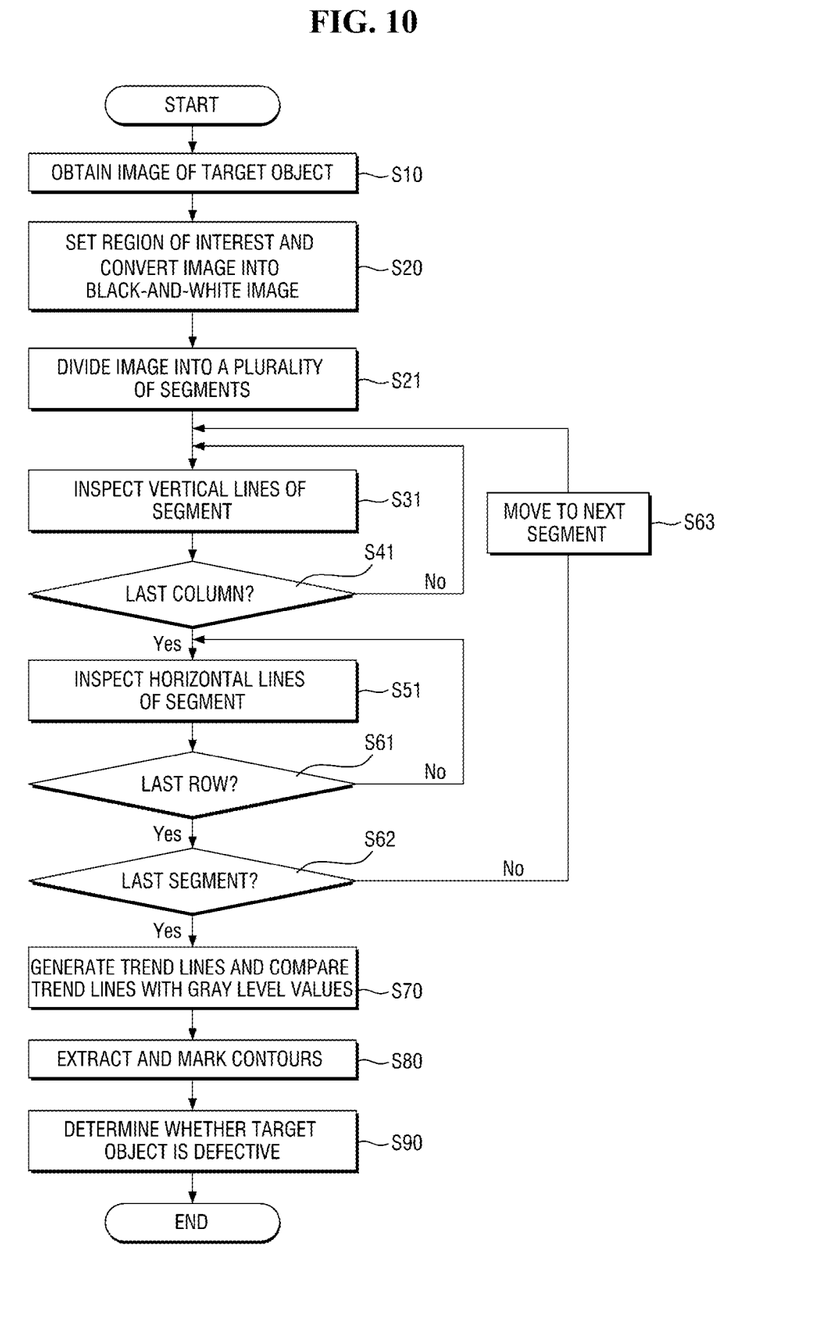
FIG. 10 is a flowchart illustrating a defect detection method according to an exemplary embodiment.
Figure 11:
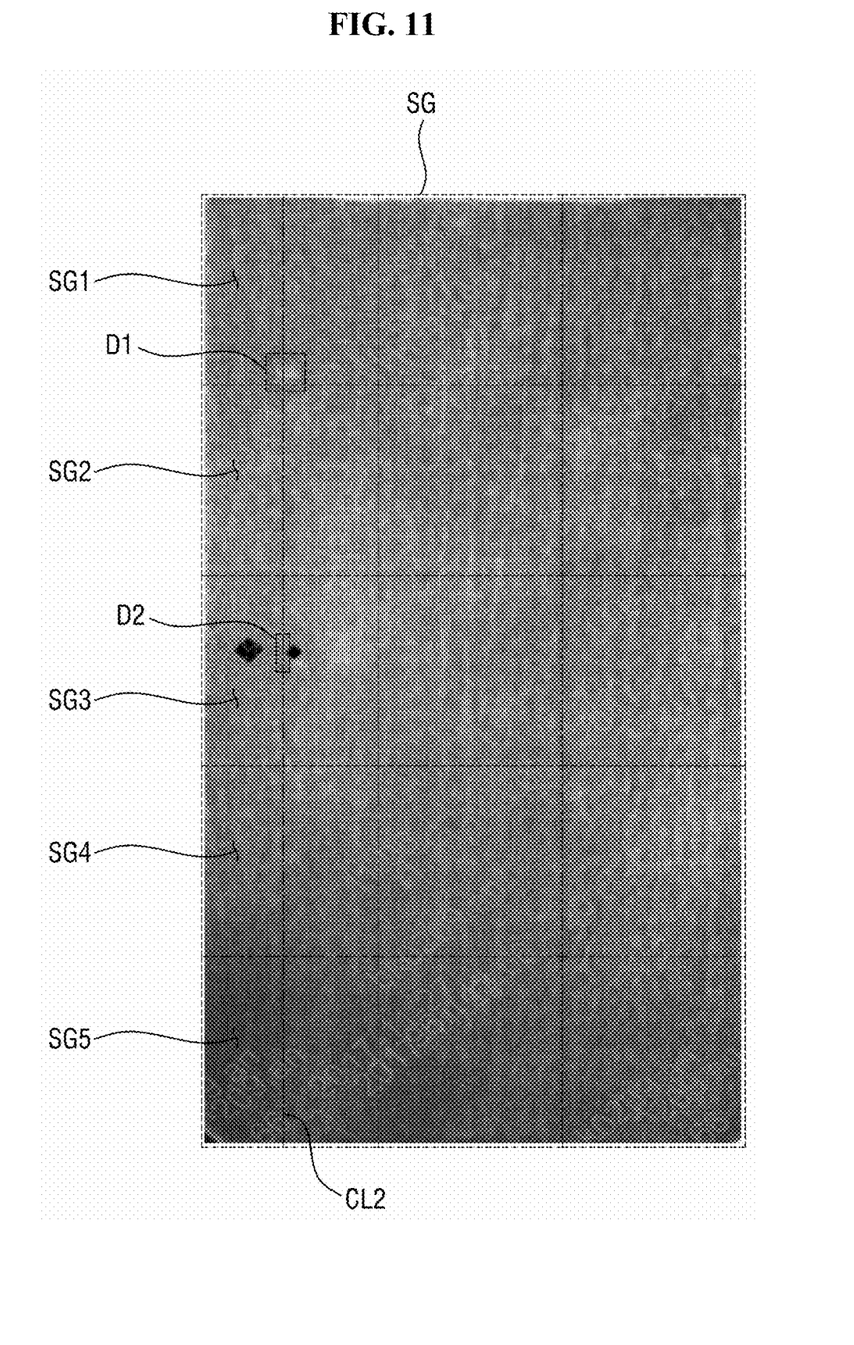
FIG. 11 shows an image divided into a plurality of segments by the defect detection method of FIG. 10.
Figure 12:
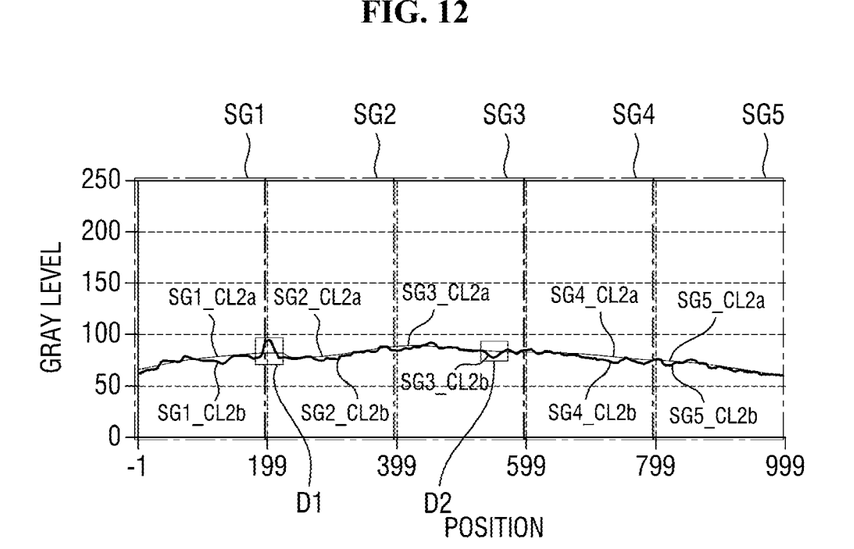
FIG. 12 is a graph illustrating gray level values corresponding to an inspection column shown in FIG. 11 and trend lines generated based on the gray level values.

FIG. 10 is a flowchart illustrating a defect detection method according to an embodiment. FIG. 11 shows an image divided into a plurality of segments by the defect detection method according to the embodiment. FIG. 12 is a graph illustrating gray level values corresponding to an inspection column CL2 shown in FIG. 11 and trend lines generated based on the gray level values. A description of elements and features identical to those described above with reference to FIGS. 1 through 9 will be omitted.

Referring to FIGS. 1, 4, and 10 through 12, the defect detector 320 may divide an image 410 into a plurality of segments SG (operation S21). In the present specification, the dividing of the image 410 into the segments SG (operation S21) is performed after a region of interest ROI is set in the image 410 and the image 410 is converted into a black-and-white image (operation S20). However, the inventive concepts are not limited to this case. That is, the order of the setting of the region of interest ROI in the image 410, the converting of the image 410 into the black-and-white image, and the dividing of the image 410 into the segments SG are not particularly limited.

When the image 410 is divided into a plurality of segments SG, the number of the segments SG is not particularly limited. In addition, the segments SG can have different shapes and sizes.

The defect detector 320 may calculate gray level values in the vertical direction in one segment (operation S31). When the inspection of the vertical lines is completed, that is, after a last vertical column is inspected (operation S41), the defect detector 320 may calculate gray level values in the horizontal direction in the segment whose vertical lines have been inspected (operation S51). When the inspection of the horizontal lines is completed, that is, after a last horizontal row is inspected (operation S61), it may be checked whether the segment is a last segment (operation S62). If the segment is not the last segment, the defect detector 320 may move to a next segment (operation S63).

In this way, the vertical line inspection and the horizontal line inspection may be performed in each of the segments SG to generate a gray level value variation line and a trend line for each of the segments SG. While a case where the defect detector 320 moves to a next segment after performing both the vertical line inspection and the horizontal line inspection in a segment has been described above, the inventive concepts are not limited to this case. In an exemplary embodiment, the vertical or horizontal line inspection may be performed simultaneously in a plurality of segments SG to generate a gray level value variation line and a trend line for each segment SG at a time.

In FIGS. 11 and 12, first through fifth segments SG1 through SG5 will be described as an example. Referring to FIGS. 11 and 12, in the defect detection method according to this exemplary embodiment, vertical line inspection and horizontal line inspection may be performed independently in the first through fifth segments SG1 through SG5. Accordingly, trend lines SG1_CL2a through SG5 CL2a can be generated as quadratic or cubic equations based on gray level value variation lines SG1_CL2b through SG5 CL2b formed by connecting gray level values for an inspection column CL2 in the first through fifth segments SG1 through SG5.

Using this method, it is possible to more accurately detect stain regions D1 and D2 of the image shown in FIG. 11.

According to exemplary embodiment of the present disclosure, stain defect detection accuracy can be increased.

In addition, since defect inspection is applied between module processes, the execution of unnecessary subsequent processes can be prevented.

The effects of the present invention are not limited by the foregoing, and other various effects are anticipated herein.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A defect detection apparatus comprising:
   a region setter which sets a region of interest in an image including a plurality of pixels; and
   a defect detector which divides the region of interest into a plurality of segments and generates a trend line for each of the segments based on gray level values of the pixels, wherein the defect detector detects a stain in the image by comparing the gray level values of the pixels with the trend line.

2. The apparatus of claim 1, wherein the defect detector calculates the gray level values of the pixels disposed in each of the segments along at least one of a vertical line and a horizontal line.

3. The apparatus of claim 1, wherein the defect detector generates the trend line by applying a least squares method to the gray level values of the pixels.

4. The apparatus of claim 1, wherein the defect detector detects the stain in the image by comparing a distance value between a gray level value variation line formed by connecting the gray level values of the pixels and the trend line with a preset value.

5. The apparatus of claim 1, wherein the region setter converts the image into a black-and-white image and provides the black-and-white image to the defect detector.

6. A defect detection apparatus comprising:
a target object;
a photographing unit which generates an image having a plurality of pixels by photographing the target object; and
a defect determination unit which receives the image and determines whether the target object is defective by detecting a stain in the image,
wherein the defect determination unit divides the image into a plurality of segments, generates a trend line for each of the segments based on gray level values of the pixels, and detects the stain in the image by comparing the gray level values of the pixels with the trend line.

7. The apparatus of claim 6, wherein the target object includes a protective film.

8. The apparatus of claim 6, wherein the defect determination unit calculates the gray level values of the pixels disposed in each of the segments along at least one of a vertical line and a horizontal line.

9. The apparatus of claim 6, wherein the defect determination unit generates the trend line by applying a least squares method to the gray level values of the pixels.

10. A defect detection method comprising:
setting a region of interest in an image including a plurality of pixels;
dividing the region of interest into a plurality of segments;
calculating gray level values of the pixels in each of the segments;
generating a trend line based on the calculated gray level values; and
detecting a stain in the image by comparing the gray level values with the trend line.

11. The method of claim 10, wherein the calculating of the gray level values calculates the gray level values of the pixels disposed in each of the segments along at least one of a vertical line and a horizontal line.

12. The method of claim 10, wherein the generating of the trend line generates the trend line by applying a least squares method to the gray level values of the pixels.

13. The method of claim 10, wherein the detecting of the stain in the image detects the stain in the image by comparing a distance value between a gray level value variation line formed by connecting the gray level values of the pixels and the trend line with a preset value.

14. The method of claim 10, further comprising:
converting the image into a black-and-white image.

15. The method of claim 10, further comprising:
generating the image by photographing a target object before the setting of the region of interest.

16. The method of claim 15, wherein the target object including a protective film.

* * * * *